(12) United States Patent
Holgersson

(10) Patent No.: US 11,974,519 B2
(45) Date of Patent: May 7, 2024

(54) SYSTEM AND METHOD FOR NAVIGATING A ROBOTIC LAWNMOWER INTO A DOCKETING POSITION

(71) Applicant: HUSQVARNA AB, Huskvarna (SE)

(72) Inventor: Jonas Holgersson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 952 days.

(21) Appl. No.: 16/965,686

(22) PCT Filed: Jan. 21, 2019

(86) PCT No.: PCT/SE2019/050036
§ 371 (c)(1),
(2) Date: Jul. 29, 2020

(87) PCT Pub. No.: WO2019/151919
PCT Pub. Date: Aug. 8, 2019

(65) Prior Publication Data
US 2021/0037703 A1    Feb. 11, 2021

(30) Foreign Application Priority Data

Jan. 31, 2018   (SE) .................... 1850108-0

(51) Int. Cl.
*A01D 34/00* (2006.01)
*G05D 1/00* (2006.01)

(52) U.S. Cl.
CPC ......... *A01D 34/008* (2013.01); *G05D 1/0223* (2013.01); *G05D 1/0225* (2013.01); *G05D 1/0265* (2013.01)

(58) Field of Classification Search
CPC .... A01D 34/008; A01D 34/00; G05D 1/0223; G05D 1/0225; G05D 1/0265;
(Continued)

(56) References Cited

U.S. PATENT DOCUMENTS

| 5,347,456 A | 9/1994 | Zhang et al. |
| 2013/0199144 A1* | 8/2013 | Bernini ................... B60L 50/52 56/10.2 A |

(Continued)

FOREIGN PATENT DOCUMENTS

| EP | 1906205 A1 | 4/2008 |
| EP | 2625946 A1 | 8/2013 |

(Continued)

OTHER PUBLICATIONS

Swedish Search Report for Application No. 1850108-0 dated Oct. 8, 2018.

(Continued)

*Primary Examiner* — Anne Marie Antonucci
*Assistant Examiner* — Jewel Ashley Kuntz
(74) *Attorney, Agent, or Firm* — Burr & Forman LLP

(57) ABSTRACT

A robotic lawnmower system comprising a charging station (210) and a robotic lawnmower (100), the charging station comprising a signal generator (240) to which a navigation signal cable (260; 250) is to be connected, the signal generator (240) being configured to transmit a signal (265; 245) through the navigation signal cable (260; 250), and the robotic lawnmower (100) comprising: a propulsion system (130, 50); a sensor (170) configured to sense field values of magnetic fields generated by the signal (265; 245) in the navigation signal cable (260; 250); and a controller (110) configured to determine that the robotic lawnmower (100) is in a docking position; record the field value(s) of the sensed signal; control the propulsion system (130, 150) to reverse out of said docking position; and to control the propulsion system (130,150) to enter into said docking position by sensing a current field value; comparing the current field value to the stored field value(s); and determining how to (Continued)

navigate the robotic lawnmower (100) based on the comparison and navigating accordingly.

16 Claims, 3 Drawing Sheets

(58) Field of Classification Search
CPC .......... G05D 2201/0208; G05D 1/0259; Y02T 10/70; Y10S 901/01
See application file for complete search history.

(56) References Cited

U.S. PATENT DOCUMENTS

| | | | |
|---|---|---|---|
| 2014/0012453 A1* | 1/2014 | Johnson | G05D 1/0219 701/23 |
| 2015/0373906 A1 | 12/2015 | Jagenstedt et al. | |
| 2016/0000005 A1* | 1/2016 | Sjöholm | B60L 53/14 700/258 |
| 2016/0227704 A1 | 8/2016 | Yamamura | |
| 2016/0332526 A1 | 11/2016 | Svensson et al. | |
| 2017/0139419 A1 | 5/2017 | Jagenstedt et al. | |
| 2017/0322562 A1* | 11/2017 | Churavy | A01D 34/008 |

FOREIGN PATENT DOCUMENTS

| | | |
|---|---|---|
| EP | 3112969 A1 | 1/2017 |
| JP | 2011129049 A | 6/2011 |
| WO | 2017167207 A1 | 10/2017 |
| WO | 2017192981 A1 | 11/2017 |
| WO | 2018001358 A1 | 1/2018 |

OTHER PUBLICATIONS

International Search Report and Written Opinion for International Application No. PCT/SE2019/050036 dated Apr. 26, 2019.

* cited by examiner

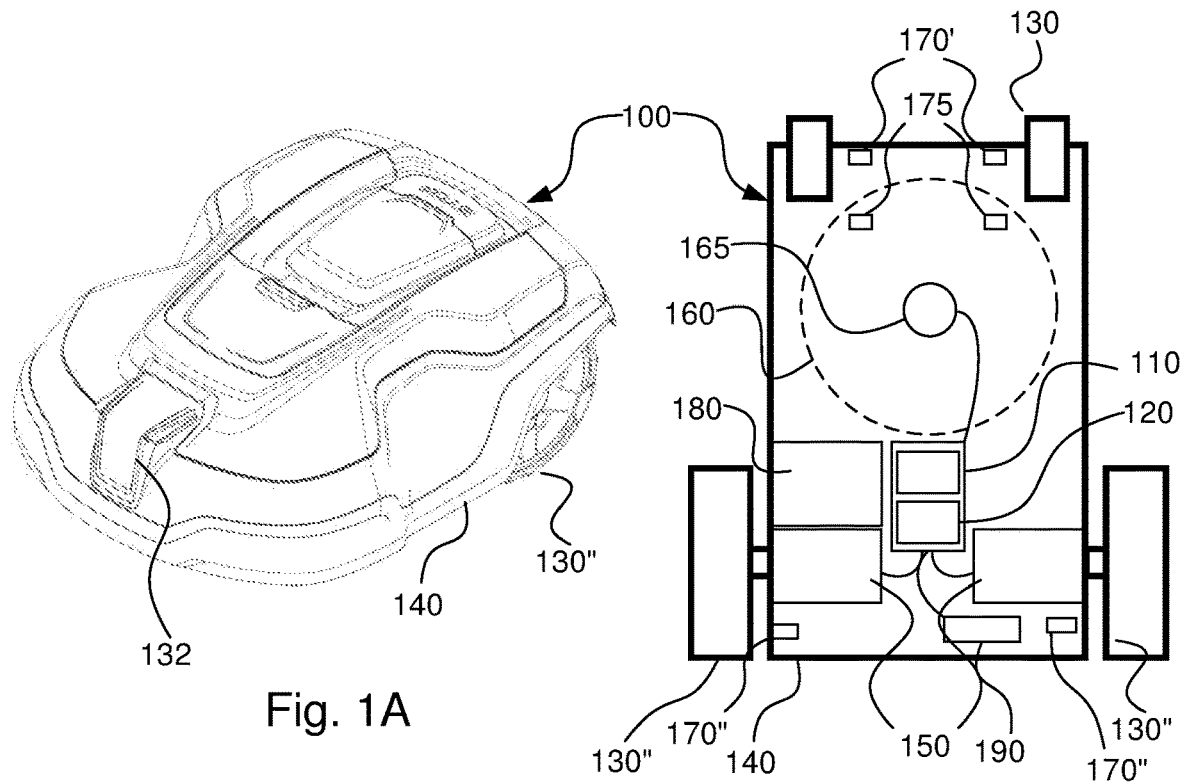
Fig. 1A
Fig. 1B
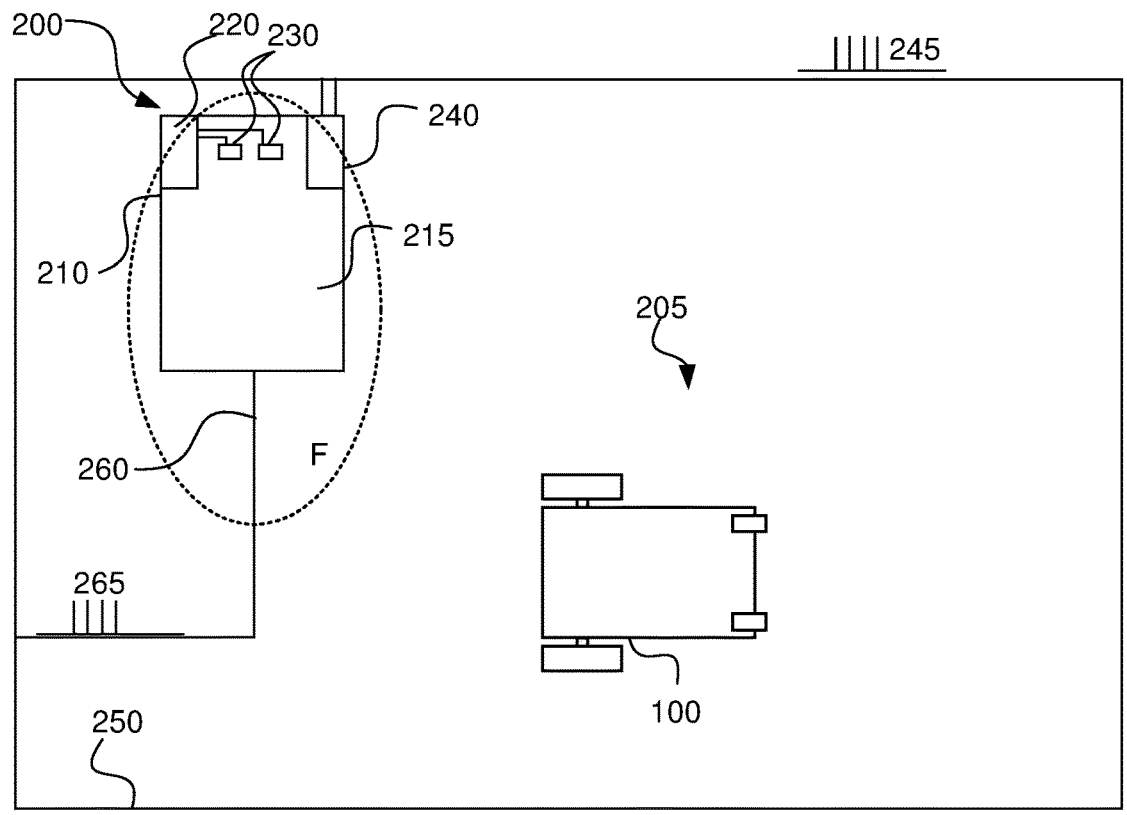
Fig. 2

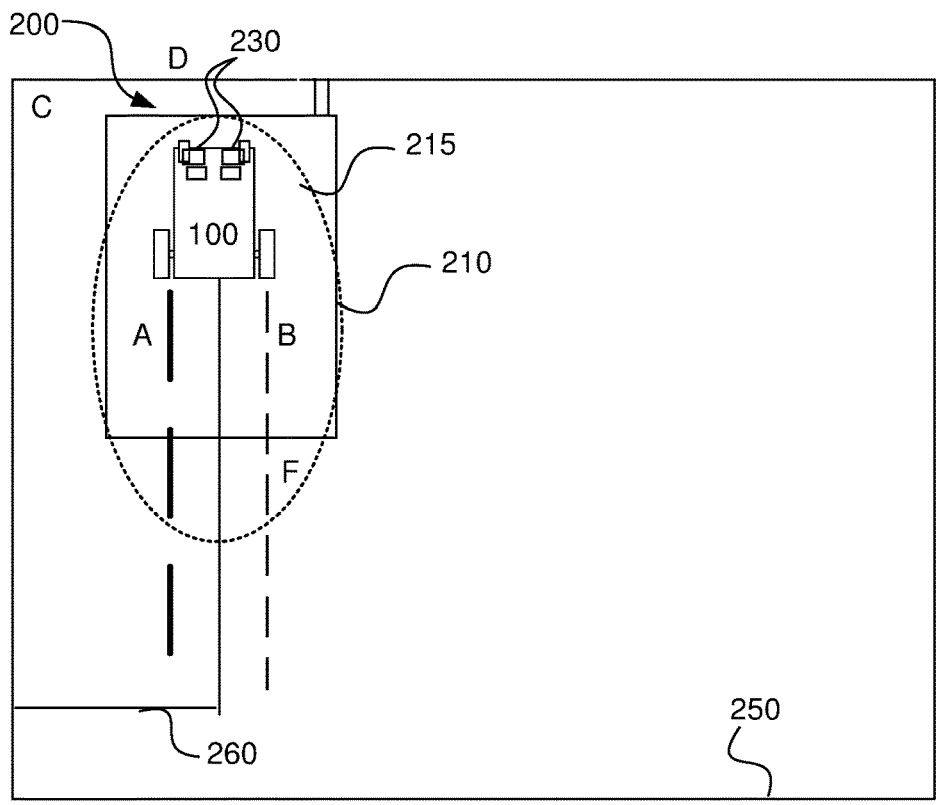
Fig.3
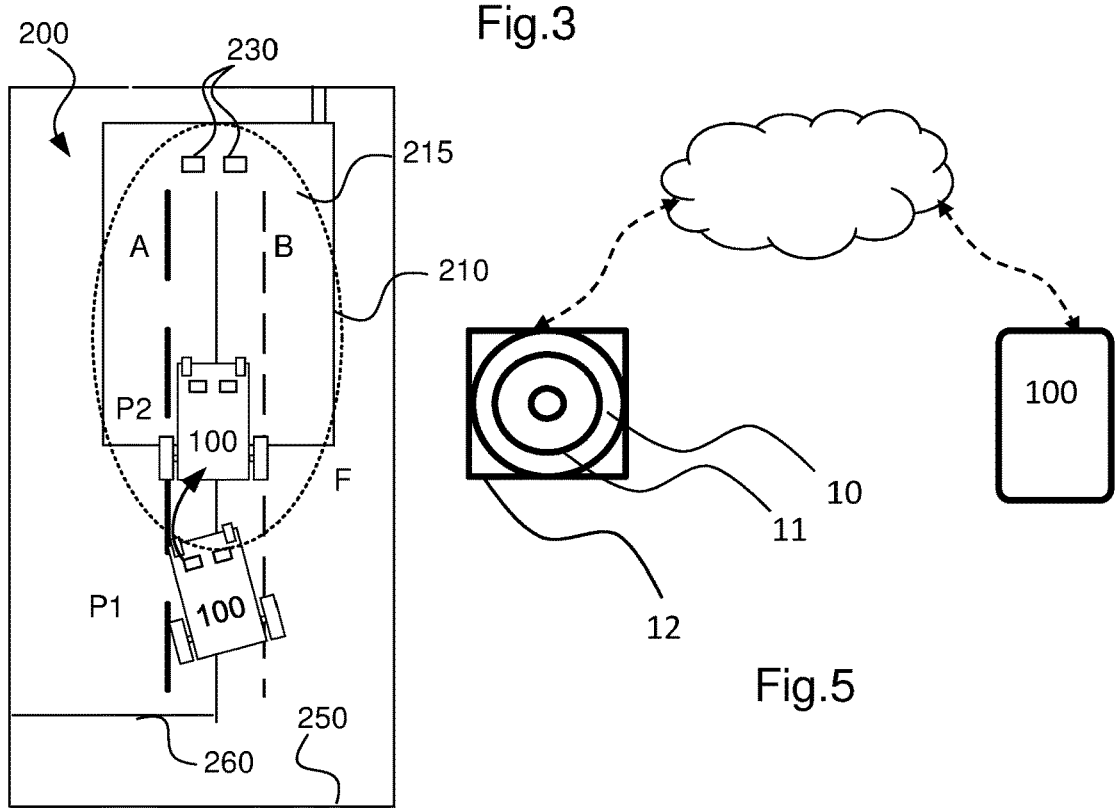
Fig.4
Fig.5

SYSTEM AND METHOD FOR NAVIGATING A ROBOTIC LAWNMOWER INTO A DOCKETING POSITION

TECHNICAL FIELD

This application relates to robotic work tools and in particular to a system and a method for performing improved navigation, such as guiding of a robotic lawnmower.

BACKGROUND

Today's robotic lawnmowers commonly use the detection of magnetic fields emitted by a boundary cable as positioning system. A use case requiring especially high precision from the positioning system is when the robotic lawnmower is finding its way into its charging station, i.e. docking.

In some system this high precision positioning system is enabled by specific loop cables comprised within the charging station. Each of those loop cables will emit a respective field (called N for "near field" and F for "far field") that enables the robotic lawnmower to find the docking station (F field) and to navigate precisely in relation to the base plate (N field). Some disadvantages of such systems are that they are expensive and troublesome to produce.

In some systems a guide cable is used to generate the magnetic field to lead the way all the way into the charging station. This removes the need for an N-field (and thus its loop cable).

In some systems, the guiding is facilitated by large mechanical "guide walls" on the charging station base plate, and most importantly by setting restrictions in the user manual to the placement of the charging station and the loop cables close to it. These restrictions to the placement of the charging station in the garden are hard to explain to the user, they cause a nuisance for the user when trying to find a suitable spot to install their charging station. In small and complicated gardens it can be almost impossible to find a spot that fulfills the requirements given in the user manual.

Thus, there is a need for improved navigation and docking with the charging station.

SUMMARY

As will be disclosed in detail in the detailed description, the inventors have realized that the traditional manner of docking with a charging station brings about many problems and disadvantages. However, the inventors have realized and identified problems with traditional manner of docking with the charging station. One problem is that the field sensed from the guide cable, when using the guide cable to navigate the base plate, differs because the length of the guide cable loop, the shape of the loop and the distance to other cables differ. One instance when the field differs between installations is when the guide cable loop is created using one side of the boundary cable as part of the loop. As mentioned, the field sensed by the robotic lawnmower will also be very much dependent on the shape of the boundary cable close to the charging station. The field may also be dependent on any extra cable being stuffed behind the charging station.

As for the prior art utilizing both of the N and F-fields, the inventors have also realized that they also add to the interference generated by a robotic lawnmower system. As for the prior art utilizing the guide cable for navigating to the docking, the inventors have realized, a major disadvantage of this is that the field from the guide cable, at least close to the charging station, will be different when comparing different customer installations.

The teachings herein bring about a system that gives the user much more flexibility regarding the placement of the charging station and enables the user to not have to care about any restrictions regarding placement of the boundary/guide signal wires around the charging station. And makes the robotic lawnmower system easier to produce and reduces the price of the robotic lawnmower system. The teachings herein removes (or at least reduces) the need for having both N- and F-fields, and at least reduces the requirements for the placement of the cable generating the F-field. Also, the teachings herein removes (or at least reduces) the need for mechanical guide walls on the base plate. To accomplish this, a method and a robotic lawnmower system has been developed, allowing the robotic lawnmower to learn the specific "magnetic field landscape" close to its charging station, and thus achieve a high precision docking only using the guide cable.

It is therefore an object of the teachings of this application to overcome or at least reduce those problems by providing a robotic lawnmower system comprising a charging station and a robotic lawnmower, the charging station comprising a signal generator to which a navigation signal cable is to be connected, the signal generator being configured to transmit a signal through the navigation signal cable, and the robotic lawnmower comprising: a propulsion system; a sensor configured to sense field values of magnetic fields generated by the signal in the navigation signal cable; and a controller configured to determine that the robotic lawnmower is in a docking position; record the field value(s) of the sensed signal; control the propulsion system to move in relation to said docking position, such as by exiting it; and to control the propulsion system to enter into said docking position by sensing a current field value; comparing the current field value to the stored field value(s); and determining how to navigate the robotic lawnmower based on the comparison and navigating accordingly. The navigation signal cable may, for example, be a boundary wire defining a work area, a guide cable extending from the charging station into the work area for guiding the robotic lawnmower to the docking station, an N field loop comprised within the charging station, an F field loop comprised within the charging station, or any combination of those.

It is also an object of the teachings of this application to overcome the problems by providing a method for use in a robotic lawnmower system comprising a charging station and a robotic lawnmower, the charging station comprising a signal generator to which a navigation signal cable is to be connected, the signal generator being configured to transmit a signal through the navigation signal cable, and the robotic lawnmower comprising: a propulsion system; a sensor configured to sense field values of magnetic fields generated by the signal in the navigation signal cable; the method comprising determining that the robotic lawnmower is in a docking position; recording the field value(s) of the sensed signal; controlling the propulsion system to move in relation to said docking position, such as by exiting it; and controlling the propulsion system to enter into said docking position by sensing a current field value; comparing the current field value to the stored field value(s); and determining how to navigate the robotic lawnmower based on the comparison and navigating accordingly.

It is also an object of the teachings of this application to overcome the problems by providing a computer readable storage medium encoded with instructions that, when executed on a controller, perform the method according to herein.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which:

FIG. 1A shows an example of a robotic lawnmower according to one embodiment of the teachings herein;

FIG. 1B shows a schematic view of the components of an example of a robotic lawnmower according to one embodiment of the teachings herein;

FIG. 2 shows an example of a robotic lawnmower system according to the teachings herein;

FIG. 3 shows a schematic overview of a robotic lawnmower system, such as that in FIG. 2, in which a robotic lawnmower is configured to operate according to the teachings an example embodiment of the teachings herein;

FIG. 4 shows a schematic overview of a robotic lawnmower system, such as that in FIG. 2 or 3, in which a robotic lawnmower is configured to operate according to the teachings an example embodiment of the teachings herein;

FIG. 5 shows a schematic overview of a computer readable storage medium encoded with instructions that, when executed on a controller, perform the method according to an example embodiment of the teachings herein.

DETAILED DESCRIPTION

Figure 6A:
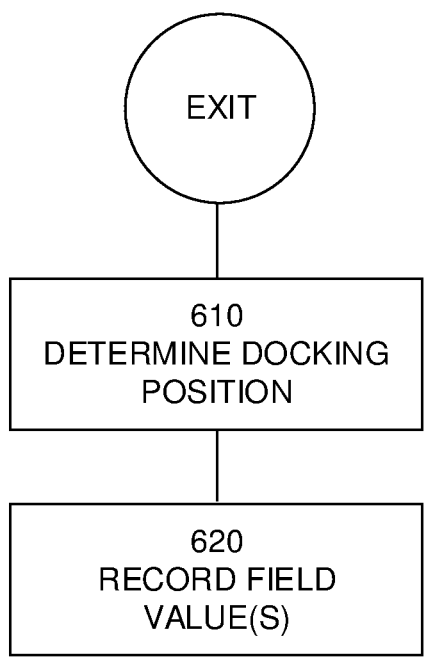
FIG. 6A shows a flowchart for a method for an robotic lawnmower exiting a charging station according to an example embodiment of the teachings herein.

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

It should be noted that all indications of rotational speeds, time durations, work loads, battery levels, operational levels etc. are given as examples and may be varied in many different ways as would be apparent to a skilled person. The variations may be for individual entities as well as for groups of entities and may be absolute or relative.

FIG. 1A shows a perspective view of a robotic working tool 100, here exemplified by a robotic lawnmower 100, having a body 140 and a plurality of wheels 130 (only one shown). As can be seen, the robotic lawnmower 100 may comprise charging skids for contacting contact plates (not shown in FIG. 1, but referenced 230 in FIG. 2) when docking into a charging station (not shown in FIG. 1, but referenced 210 in FIG. 2) for receiving a charging current through, and possibly also for transferring information by means of electrical communication between the charging station and the robotic lawnmower 100.

FIG. 1B shows a schematic overview of the robotic working tool 100, also exemplified here by a robotic lawnmower 100, having a body 140 and a plurality of wheels 130. It should be noted that even though the description given herein will be focused on robotic lawnmowers, the teachings herein may also be applied to other robotic tools, and in particular self-propelled robotic tools, such as garden robotic tools or outdoor robotic tools in general. By way of example, the teachings herein may be applied to robotic vacuum cleaners and/or robotic floor cleaners, robotic ball collectors, robotic mine sweepers, robotic farming equipment, or other robotic work tools to be employed in a work area, which may optionally be defined by a boundary cable.

In the exemplary embodiment of FIG. 1B the robotic lawnmower 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor. The motor 150 and the wheels 130 combines to provide a propulsion system for the robotic lawnmower 100.

In the example of FIG. 1B, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 may further have at least one sensor 170; in the example of FIG. 1 there are four sensors divided into a first sensor pair 170' and a second sensor pair 170", respectively arranged at each wheel 130', 130" to detect a magnetic field (not shown) and for detecting a boundary cable and/or for receiving (and possibly also sending) information from a signal generator (will be discussed with reference to FIG. 2). The sensors 170 may thus be arranged as front sensors 170' and rear sensors 170".

In some embodiments, the sensors 170 may be connected to the controller 110, and the controller 110 may be configured to process and evaluate any signals received from the sensor pairs 170, 170'. The sensor signals may be caused by the magnetic field being generated by a control signal being transmitted through a boundary cable. This enables the controller 110 to determine whether the robotic lawnmower 100 is close to or crossing a boundary cable, or inside or outside an area enclosed by the boundary cable. This also enables the robotic lawnmower 100 to receive (and possibly send) information from the control signal.

The robotic lawnmower 100 also comprises a grass cutting device 160, such as a rotating blade 160 driven by a cutter motor 165. The grass cutting device being an example of a work tool 160 for a robotic work tool 100. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic lawnmower 100 also has (at least) one battery 180 for providing power to the motors 150 and the cutter motor 165.

The robotic lawnmower 100 may also have charging plates 175, for example two, are arranged to co-operate with corresponding charging plates (referenced 230 in FIG. 2) of a charging station (referenced 210 in FIG. 2) for charging the battery 180 of the robotic lawnmower 100.

FIG. 2 shows a schematic view of a robotic working tool system 200 in one embodiment. The schematic view is not to scale. The robotic working tool system 200 comprises a charging station 210 and a boundary cable 250 arranged to enclose a work area 205, in which the robotic lawnmower 100 is supposed to serve.

As with FIG. 1, the robotic working tool is exemplified by a robotic lawnmower, but the teachings herein may also be applied to other robotic working tools adapted to operate within a work area defined by a boundary cable.

The charging station may have a base plate 215 for enabling the robotic lawnmower to enter the charging station in a clean environment and for providing stability to the charging station 210.

The charging station 210 has a charger 220, in this embodiment coupled to two charging plates 230. The charging plates 230 are arranged to co-operate with corresponding charging plates (referenced 175 in FIG. 1) of the robotic lawnmower 100 for charging the battery 180 of the robotic lawnmower 100.

The charging station 210 also has, or may be coupled to, a signal generator 240 for providing a control signal 245 to be transmitted through the boundary cable 250. The signal generator thus comprises a controller for generating the control signal. The control signal 245 comprises an alternating current, such as a continuously or regularly repeated current signal. The control signal may be a CDMA signal (CDMA—Code Division Multiple Access). The control signal may also or alternatively be a pulsed control signal, the control signal thus comprising one or more current pulses being transmitted periodically. The control signal may also or alternatively be a continuous sinusoidal wave. As is known in the art, the current signal will generate a magnetic field around the boundary cable 250 which the sensors 170 of the robotic lawnmower 100 will detect. As the robotic lawnmower 100 (or more accurately, the sensor 170) crosses the boundary cable 250 the direction of the magnetic field will change. The robotic lawnmower 100 will thus be able to determine that the boundary cable has been crossed, and take appropriate action by controlling the driving of the rear wheels 130" to cause the robotic lawnmower 100 to turn a certain angular amount and return into the work area 205. For its operation within the work area 205, in the embodiment of FIG. 2, the robotic lawnmower 100 may alternatively or additionally use the satellite navigation device 190 to navigate the work area 205.

Additionally, the robotic lawnmower 100 may use the satellite navigation device 190 to remain within and map the work area 205 by comparing the successive determined positions of the robotic lawnmower 100 against a set of geographical coordinates defining the boundary 250, obstacles, keep-out areas etc of the work area 205. This set of boundary defining positions may be stored in the memory 120, and/or included in a digital (virtual) map of the work area 205. The boundary 250 of the work area 205 may also be marked by a boundary cable supplementing the GNSS navigation to ensure that the robotic work tool stays within the work area, even when no satellite signals are received.

The use of more than one sensor 170 enables the controller 110 of the robotic lawnmower 100 to determine how the robotic lawnmower 100 is aligned with relation to the boundary cable 250 by comparing the sensor signals received from each sensor 170. This enables the robotic lawnmower to follow the boundary cable 250, for example when returning to the charging station 210 for charging. The charging station 210 also has a guide cable 260 for enabling the robotic lawnmower to find the entrance of and to dock with the charging station 210. The signal generator 240 is also arranged for providing a guide signal 265 to be transmitted through the guide cable 265. In some embodiments the guide cable 260 is formed by a loop of the boundary cable 250. In some embodiments the guide cable 260 is used to generate a magnetic field for enabling the robotic lawnmower 100 to find the charging station without following a guide cable 260. As can be seen, the guide cable 260 may be connected to the boundary cable 250, the guide signal and the boundary signal thus sharing the same cable, i.e. the boundary cable 250, when connecting to the charging station 210.

Optionally, the charging station 210 may have an F-field F for enabling the robotic lawnmower to find the charging station 210 from a distance.

FIG. 3 shows a schematic overview of a robotic lawnmower system 200, such as that in FIG. 2, in which a robotic lawnmower 100 is configured to follow the guide cable 260 according to the teachings herein.

As can be seen in FIG. 3, the fields emitted by the guide cable 260 differ in strength. This is illustrated by dashed lines having different thickness showing that at points A and B, being equidistant from the guide cable 260, the field has different field values, stronger at point A (thicker dashed line) than at point B (thinner dashed line). One reason that the field is stronger at point A is that it is closer to the boundary cable 250 to which the guide cable is connected for sharing the boundary cable to return the guide signal to the charging station. Another or alternative reason may be that there is a bundle of extra loop cable being stashed at point D (behind the charging station) which may also add to the signal field.

Prior art systems may not allow the user to place the charging station too close to the corner of the boundary cable, such as at point C, but utilizing the teachings herein, such placement becomes possible and allowed.

It should be noted that as magnetic fields change their polarity from one side of a cable to the other, the recording of the magnetic field values may register the amplitude alone, or the amplitude as well as the polarity of the magnetic field.

Figure 6B:
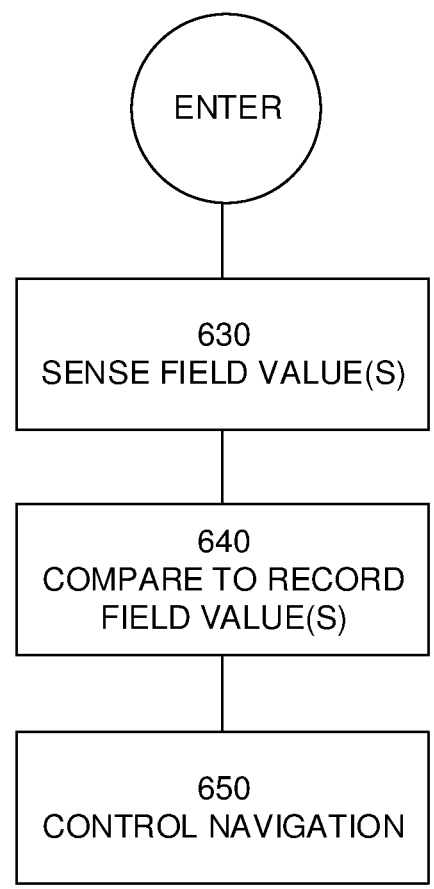
FIG. 6B shows a flowchart for a method for a robotic lawnmower entering a charging station according to an example embodiment of the teachings herein.

In the following, the operation of the robotic lawnmower 100 according to the teachings herein will be disclosed with reference to the figures. It should be noted that compared to prior art systems, additional hardware may not be needed and a robotic lawnmower may thus be adapted to operate according to the teachings herein through a software update, such as through receiving computer instructions carried on a computer readable medium as disclosed with reference to FIGS. 3, 4, 6A and 6B. FIG. 6A shows a flowchart for a method for a robotic lawnmower exiting a charging station. FIG. 6B shows a flowchart for a method for a robotic lawnmower entering a charging station.

Starting when the robotic lawnmower 100 is about to exit (EXIT) the charging station, but still standing in its charging station 210 it is in a known position, which also happens to be the desired goal during the docking maneuver. The robotic lawnmower 100 is thus configured to determine 610 that it is in the docking position. The robotic lawnmower 100 may be configured to determine that it is in the right place, i.e. the docking position, when the charging plates of the robotic lawnmower 100 (referenced 175 in FIG. 1) are in contact with the corresponding charging plates 230 of the charging station 210. When the robotic lawnmower exits, such as by reversing out from, the charging station 210, the robotic lawnmower 100 is configured to record (i.e. sense and store) 620 one or several sensed signal field values. The signals may be recorded even if the robotic lawnmower is not exiting the charging station, but merely moves in relation to it. For example, moving back and forwards and sideways on the base plate may suffice to provide enough field values to enable proper navigation. The guide signal field value is recorded, and, for embodiments utilizing an F-field (not shown in FIG. 3, but referenced F in FIG. 2), the F-field values may also be stored. As discussed below, recording values from multiple fields provides additional dimensions to the understanding of the magnetic surroundings of the charging station. The robotic lawnmower may be configured to record the values (all or some) at one or several positions during the exit from the charging station 210.

The robotic lawnmower may be configured to record the signals while moving. In one such embodiment, the robotic lawnmower may be configured to reverse at a reduced speed to enable the controller and memory to properly record the signal values. The reduced speed is a speed that is lower than a standard operating speed, at which the robotic lawnmower aims to travel during operation.

The robotic lawnmower may alternatively or additionally be configured to record the signals stopping at several different locations.

In one embodiment, the robotic lawnmower is configured to stop and record as soon as it detects that the contact with the charging plates has been lost. This provides a secure and reliable reading of the field values very close to the docking position without risking interference from the charging procedure.

As the robotic lawnmower 100 later attempts to dock (ENTER) with the charging station 210, it is configured to sense 630 the emitted guide field and to navigate 650 so that the sensed value(s) corresponds to the recorded value(s). This is done by comparing 640 the sensed field value(s), with the recorded value(s) and instructing the motors to propel the robotic lawnmower accordingly. The robotic lawnmower 100 may be configured to stop, sense and compare or to sense and compare while moving. In one such embodiment, the robotic lawnmower 100 may be configured to reduce its speed when sensing and comparing to allow more time for the controller to determine the navigation to be performed.

By recording the field values at different points a field value map may be recorded of the surroundings around the charging station and the robotic lawnmower may be configured to follow this map to the charging station, by sensing the current field value and comparing it to the recorded value(s) and operating the propulsion of the robotic lawnmower accordingly, the propulsion in one embodiment being controlled by the motors 150. The navigation is performed so that the robotic lawnmower is steered towards positions where the sensed field value(s) corresponds to the recorded signal value(s). The map may be supplemented with estimated field values, for positions located between positions having been associated with recorded field values, by means of interpolation.

As the robotic lawnmower 100 reverses out of or enters into the docking station 210, it is configured, in one embodiment, to follow the guide cable, for example by having one wheel pair on either side of the guide cable. Traditionally such following is enabled by the robotic lawnmower ensuring that the field sensed by either sensor in a sensor pair senses the field at different polarities (as the polarity of the magnetic field will differ from which side of the cable it is sensed. For example, if the field at point A is positive, it is negative at point B.

However, in cases where the guide cable 260 may not be exactly aligned with the charging plates, the robotic lawnmower 100 is enabled to perform a higher precision docking by recording the field values and then following the guide cable based on the recorded signal values, instead of simply the sign shift.

In one embodiment utilizing an F-field, the robotic lawnmower 100 is configured to stop at a recorded F-field value close to the charging station, where the guide value was previously recorded. At that F-field value, the distance to the charging station is known. To know if the robotic lawnmower is also correctly placed sideways, compared to the charging station, the currently detected guide wire value is sensed and compared to the previously stored. The relation between the two values will cause one of three different outcomes. The F-field value beneficially corresponds to a short distance from the docking position. For example 1 cm, 2, cm, 3 cm, 4 cm, 5 cm, or 10 cm.

In embodiments utilizing an F-field, the field values from the guide signal 265 may be recorded in combination with the field values from the F-field. This presents a two dimensional map of the magnetic environment of the surroundings of the charging station 210.

In one embodiment, the robotic lawnmower may also or alternatively be configured to record field values of the magnetic field emitted by the control signal 245. This provides an additional dimension to the field value map. As the boundary cable most likely is connected to the charging station, the field emitted by the boundary cable is also most likely sensed around the charging station and may thus also be utilized to navigate the robotic work tool during docking.

In one embodiment the robotic lawnmower is configured to record field values from both the boundary cable and the F-field in addition to the field value(s) from the guide cable.

As the guide signal field may be different depending on which side of the charging station it is sensed, the field value and/or map gives further indication on the location of the robotic lawnmower.

The captured value is close to the stored value (within a tolerance of +/−1%, 5%, 10%) whereby the robotic lawnmower 100 is configured to drive straight into the charging station 210.

Or the captured value is significantly lower than the recorded value (falling below a threshold of 90%, 80%, 70%, 60% or 50%) whereby the robotic lawnmower 10 is configured to determine that it is aiming to much to one side of the charging station 210, see FIG. 4. The robotic lawnmower 100 may then be configured to perform a small turn to the corresponding or opposite side and then drive straight into the charging station 210. In FIG. 4, the robotic lawnmower 100 determines at point P1 that it is aimed in the wrong direction and navigates accordingly by turning towards the correct direction and then continuing towards the charging station 210 at point P2.

Or the captured value is significantly higher than the recorded value (falling above a threshold of 110%, 120%, 130%, 140% or 150%) whereby the robotic lawnmower 10 is configured to determine that it is aiming to much to the other side of the charging station 210, see FIG. 4. The robotic lawnmower 100 may then be configured to perform a small turn to the opposite side and then drive straight into the charging station 210.

The robotic lawnmower is this configured to navigate according to the recorded magnetic field values by comparing a current magnetic field value to a recorded value, and if there is a difference, steering the robotic lawnmower in a direction so that the difference is reduced.

The recorded magnetic field values may be stored in a table where a next entry in the table represents a next expected recorded value.

The recorded magnetic field values may be stored as a list of (expected) next recorded values.

The robotic lawnmower may be configured to navigate until the current values corresponds to the recorded value as they correspond, navigate based on the next (expected) recorded value.

If the user is instructed to place the robotic lawnmower 100 in the charging station 210 during the startup sequence performed as part of the installation of the robotic lawnmower 100, the robotic lawnmower 100 will be able to record reliable docking values directly when the robotic lawnmower 100 exits the charging station 210 the first time. The teachings herein will thus become effective already at the first run.

The robotic lawnmower may, as detailed above, be configured to record the magnetic field values at the first run after or part of the initiation. The robotic lawnmower may also or alternatively be configured to record the magnetic field values upon ever exiting of the charging station or, at regular intervals.

If the placement of the cables around the charging station 210 are changed, or some interference is changed or added, when the robotic lawnmower 100 is working, the robotic lawnmower 100 may get into trouble docking the first time after this. However, in an embodiment where the robotic lawnmower records the values on every exit, the robotic lawnmower 100 will be able to enter properly already next time it attempts to dock with the charging station as new field values will have been recorded as soon as the robotic lawnmower 100 exits the charging station 210.

In order to improve detection and distinguish the desired navigation signal from other signals, the controller 110 may be configured to filter the sensed signal, for example in time, frequency, and/or code domain. The filtering may be based on known characteristics of the signal generated by the signal generator, such as synchronization information, in order to properly lock on the signal. For embodiments utilizing complex guide signals, perhaps code shared multiplexing, the recorded field value may also comprise a time stamp or synchronizing information for enabling a comparison to be made.

FIG. 5 shows a schematic view of a computer-readable medium as described in the above. The computer-readable medium 10 is in this embodiment a data disc 10. In one embodiment the data disc 10 is a magnetic data storage disc. The data disc 10 is configured to carry instructions 11 that when loaded into a processor arrangement 110, such as the controller of the robotic lawnmower 100 of FIG. 1B, execute a method or procedure according to the embodiments disclosed above. The data disc 10 is arranged to be connected to or within and read by a reading device 12, for loading the instructions into the processor arrangement 110. One such example of a reading device 12 in combination with one (or several) data disc(s) 10 is a hard drive. It should be noted that the computer-readable medium can also be other mediums such as compact discs, digital video discs, flash memories or other memory technologies commonly used. In such an embodiment the data disc 10 is one type of a tangible computer-readable medium 10.

The instructions 11 may also be downloaded to a computer data reading device 100, such as the controller 110 of the robotic lawnmower 100, by comprising the instructions 11 in a computer-readable signal which is transmitted via a wireless (or wired) interface (for example via the Internet) to the computer data reading device 100 for loading the instructions 11 into a controller 110. In such an embodiment the computer-readable signal is one type of a non-tangible computer-readable medium 10. The instructions may be stored in a memory (not shown explicitly in FIG. 5, but referenced 120 in FIG. 1B) of the computer data reading device 100, i.e. the robotic lawnmower 100.

The instructions comprising the teachings according to the present invention may thus be downloaded or otherwise loaded in to a device 100 in order to cause the robotic lawnmower 100 to operate according to the teachings of the present invention.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic lawnmower system comprising a charging station and a robotic work tool, the charging station comprising a signal generator to which a navigation signal cable is to be connected, the signal generator being configured to transmit a signal through the navigation signal cable, and the robotic working tool comprising:
   a propulsion system;
   a sensor configured to sense field values of magnetic fields generated by the signal in the navigation signal cable; and
   a controller configured to
      determine that the robotic lawnmower is in a docking position, and in response thereto
      record the field values in the docking position by sensing field values of the signal in the docking position and storing the field values of the sensed signal as a stored field value; and
      control the propulsion system to move out of said docking position;
   and to control the propulsion system to enter into said docking position by sensing a current magnetic field value;
comparing the current magnetic field value to the stored field value; and
determining how to navigate the robotic lawnmower based on the comparison and navigating accordingly.

2. The robotic lawnmower system according to claim 1, wherein the controller is further configured to record a plurality of magnetic field values while exiting the charging station.

3. The robotic lawnmower system according to claim 1, wherein the navigation signal cable is a guide cable configured to extend into a work area of the robotic lawnmower for guiding the robotic lawnmower to the docking station.

4. The robotic lawnmower system according to claim 3, wherein the controller is further configured to record magnetic field values also from an F field and/or an N field.

5. The robotic lawnmower system according to claim 3, wherein the controller is further configured to record field values also from a magnetic field emitted by a control signal being transmitted through the boundary cable.

6. The robotic lawnmower system according to claim 1, wherein the controller is further configured to stop for recording the field values.

7. The robotic lawnmower system according to claim 1, wherein the controller is further configured to record said field values while moving.

8. The robotic lawnmower system according to claim 7, wherein the controller is further configured to record said field values while moving at a reduced speed relative a standard operating speed.

9. The robotic lawnmower system according to claim 1, wherein the controller is further configured to determine that the robotic lawnmower is in a docking position by determining that there is contact between a charging connector comprised in the robotic lawnmower and a charging connector comprised in the charging station.

10. The robotic lawnmower system according to claim 1, wherein the controller is further configured to record an amplitude and a polarity of the current magnetic field as a magnetic field value.

11. The robotic lawnmower system according to claim 1, wherein the guide signal comprises synchronization information, and wherein the controller is further configured to record the synchronization information.

12. The robotic lawnmower system according to claim 1, wherein the robotic lawnmower is configured to filter the sensed signal in time, frequency, and/or code domain in a filtering arrangement locking on the generated signal.

13. The robotic lawnmower system according to claim 1, wherein recording the field values of the sensed signal comprises associating a plurality of field values with respective robot positions, and storing the associations in a memory.

14. The robotic lawnmower system according to claim 1, wherein determining how to navigate the robotic lawnmower comprises determining a set of consecutive magnetic field values for the robotic lawnmower to follow.

15. A method for use in a robotic lawnmower system comprising a charging station and a robotic work tool, the charging station comprising a signal generator to which a navigation signal cable is to be connected, the signal generator being configured to transmit a signal through the navigation signal cable, and the robotic working tool comprising:
a propulsion system;
a sensor configured to sense field values of magnetic fields generated by the signal in the navigation signal cable; and
the method comprising:
determining that the robotic lawnmower is in a docking position, and in response thereto
recording the field values in the docking position by sensing field values of the signal in the docking position and storing the field values of the sensed signal as a stored magnetic field value; and
controlling the propulsion system to move out of said docking position; and
controlling the propulsion system to enter into said docking position by
sensing a current magnetic field value;
comparing the current magnetic field value to the stored magnetic field value; and
determining how to navigate the robotic lawnmower based on the comparison and navigating accordingly.

16. A non-transitory computer readable storage medium encoded with instructions that, when executed on a controller, perform the method according to claim 15.

* * * * *

UNITED STATES PATENT AND TRADEMARK OFFICE
CERTIFICATE OF CORRECTION

| | | |
|---|---|---|
| PATENT NO. | : 11,974,519 B2 | Page 1 of 1 |
| APPLICATION NO. | : 16/965686 | |
| DATED | : May 7, 2024 | |
| INVENTOR(S) | : Jonas Holgersson | |

It is certified that error appears in the above-identified patent and that said Letters Patent is hereby corrected as shown below:

On the Title Page

In the Title, "A DOCKETING POSITION" should read -- A DOCKING POSITION --

In the Specification

In Column 1, the Title, Lines 2-3, "A DOCKETING POSITION" should read -- A DOCKING POSITION --

In the Claims

In Column 11, Claim 8, Line 29, "while moving" should read -- while the robotic lawnmower is moving --

Signed and Sealed this
Twenty-sixth Day of November, 2024

Katherine Kelly Vidal
*Director of the United States Patent and Trademark Office*